(No Model.)  5 Sheets—Sheet 3.
H. R. BIRD.
MOTOR CARRIAGE.
No. 605,243. Patented June 7, 1898.
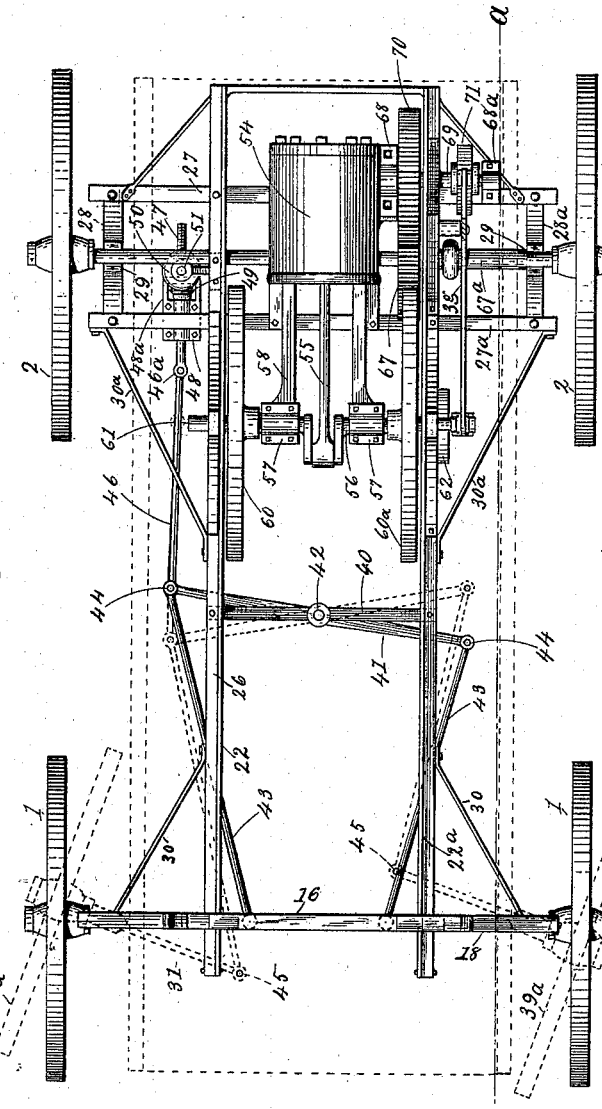
Witnesses,
George A. ...
A. J. Sangster
Henry R. Bird. Inventor.
By James Sangster, Attorney.

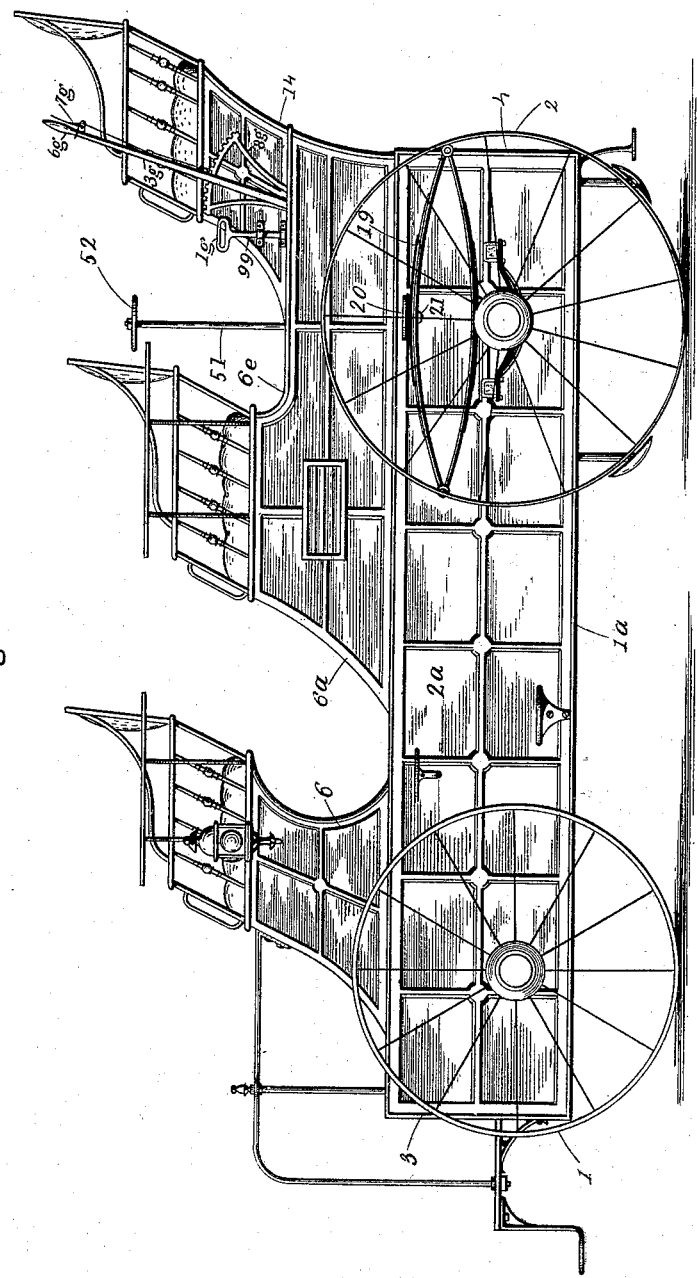

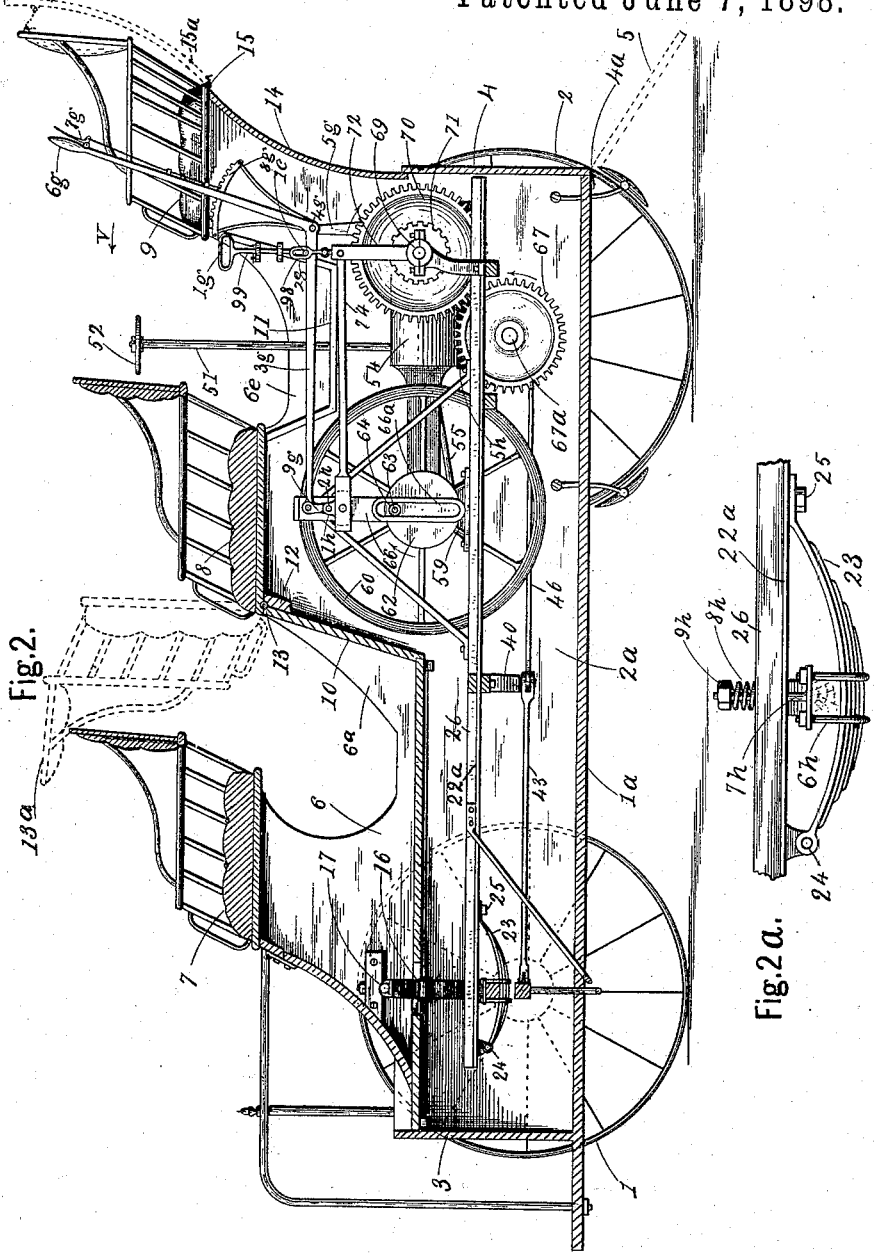

(No Model.)    H. R. BIRD.    5 Sheets—Sheet 4.
MOTOR CARRIAGE.
No. 605,243.    Patented June 7, 1898.
Fig. 7.
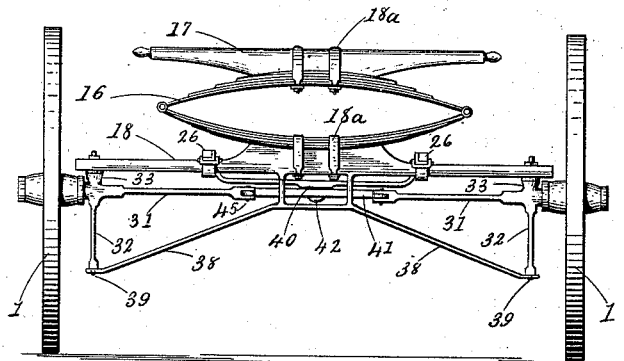
Fig. 8.
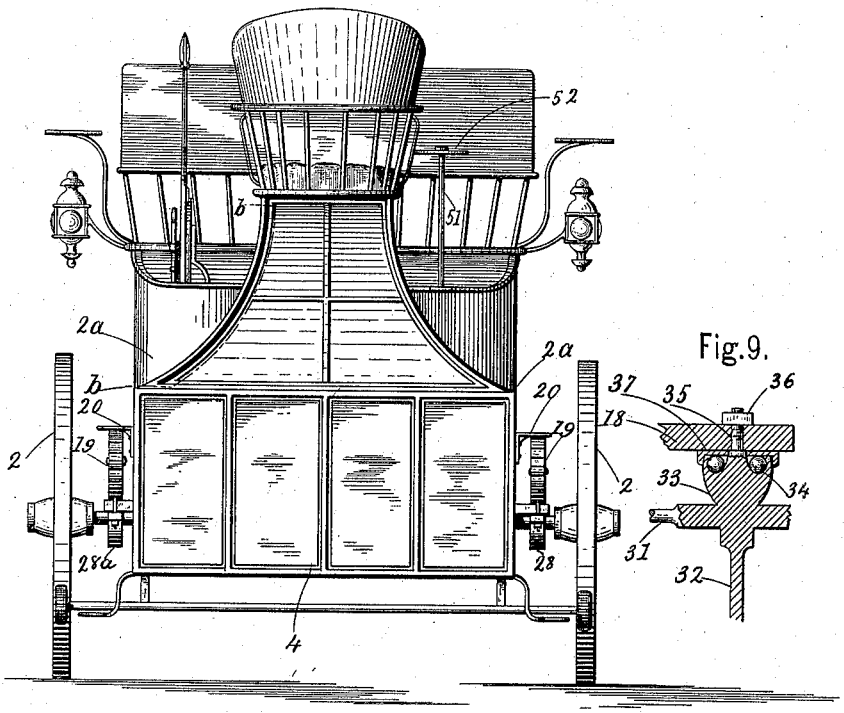
Fig. 9.
Witnesses,    Henry R. Bird.    Inventor.
By James Sangster    Attorney.

(No Model.) 5 Sheets—Sheet 5.
H. R. BIRD.
MOTOR CARRIAGE.
No. 605,243. Patented June 7, 1898.
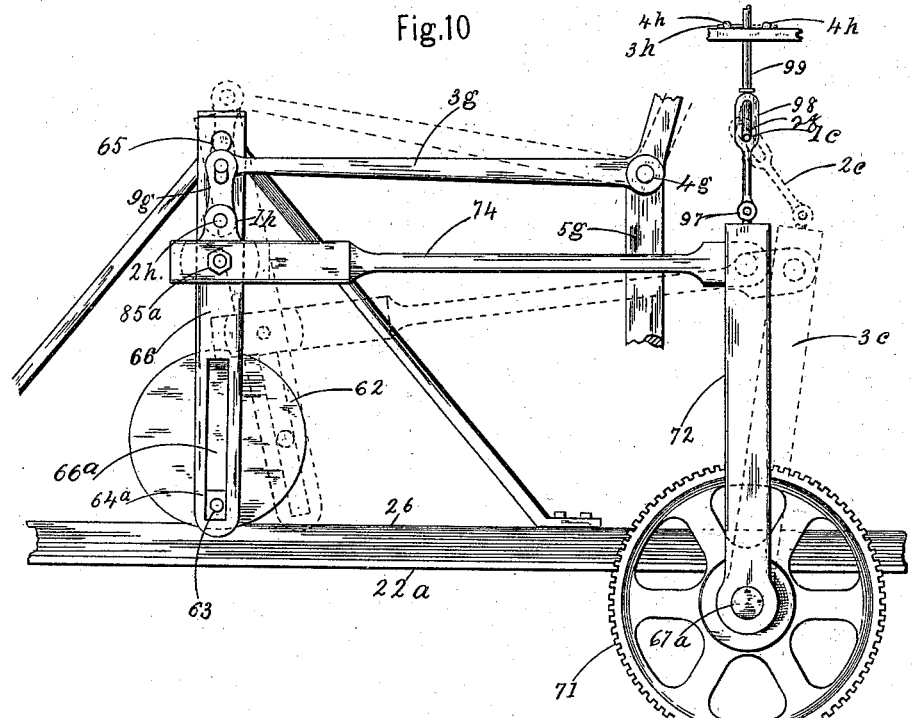
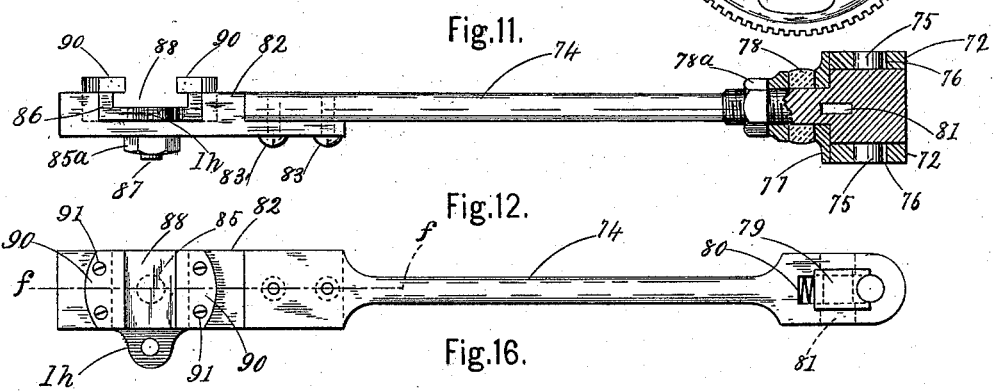
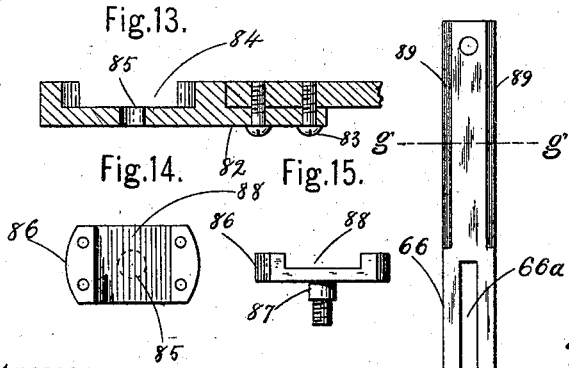
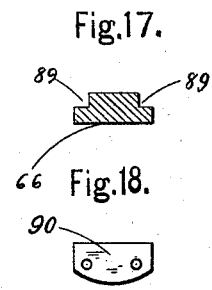
Witnesses,
George A. Neubauer
A. J. Sangster
Henry R. Bird  Inventor.
By James Sangster, Attorney.

UNITED STATES PATENT OFFICE.

HENRY R. BIRD, OF BUFFALO, NEW YORK.

MOTOR-CARRIAGE.

SPECIFICATION forming part of Letters Patent No. 605,243, dated June 7, 1898.

Application filed March 8, 1897. Serial No. 626,434. (No model.)

*To all whom it may concern:*

Be it known that I, HENRY R. BIRD, a citizen of the United States, residing at Buffalo, in the county of Erie and State of New York, have invented certain new and useful Improvements in Motor-Carriages, of which the following is a specification.

My invention relates to an improved means for propelling a horseless carriage and for starting, stopping, reversing, or regulating the speed of the same without in any way interfering with the motion of the driving-engine; and the object of my invention is to simplify and cheapen the construction thereof, to provide an efficient means for transmitting the power of the driving-motor, an easily-controlled steering device, supplementary spring mechanism for sustaining the engine and operating mechanism, spring devices for limiting the upward movement of the engine and operating mechanism, and means for adjusting said devices to regulate their limiting movement.

My invention relates, further, to the construction of the body of the carriage or inclosing case for the engine and to certain details of construction, all of which will be fully and clearly hereinafter described and claimed, reference being had to the accompanying drawings, in which—

Figure 1 represents a side elevation of the carriage complete. Fig. 2 represents a vertical longitudinal section through the body of the carriage on or about line $a\,a$, Fig. 5, cutting away one side of the carriage, also one side of the support for the rear seat on or about line $b\,b$, Fig. 8, to expose the mechanism within the carriage. Fig. 3 represents a vertical section on or about line $c\,c$, Fig. 6. Fig. 4 represents a vertical section on or about line $d\,d$, Fig. 3. Fig. 5 represents a top plan view below the seats and platform, showing the greater portion of the operating mechanism. Fig. 6 represents a top view of the device shown in Figs. 3 and 4, a horizontal section being cut through the reversing-rod on or about line $e\,e$, Fig. 4. Fig. 7 represents a front elevation showing the mechanism for turning the wheels and a similar view of the usual parts of a carriage. Fig. 8 represents a rear end elevation of the carriage complete. Fig. 9 represents a vertical section through one of the front-wheel vertical bearings. Fig. 10 represents an enlarged side elevation of a portion of the operating mechanism. Fig. 11 is a top view of one of the operating-arms, showing a section through the spring end of the same. Fig. 12 is a side elevation of the same arm, showing a slight modification of the spring end. Fig. 13 represents a vertical longitudinal section on or about line $f\,f$, Fig. 12. Fig. 14 represents a detached face view of the pivotal slideway portion. Fig. 15 represents a side elevation of the same. Fig. 16 represents a detached side elevation of the slotted arm. Fig. 17 represents an enlarged cross-section on or about line $g\,g$, Fig. 16. Fig. 18 represents a detached face view of one of the plates for completing the slotted-arm slideway.

Referring to the drawings for the details of construction, 1 and 2 are the wheels upon which the carriage-body is supported, 1 designating the front wheels, and 2 the rear wheels, of the carriage.

$1^a$ represents the under side or bottom of the carriage-body, and $2^a$ the sides of the same. The front end 3 is rigidly fixed in position, and the rear end 4 is hinged at or about the point $4^a$, Fig. 2, so that it can be turned over and down, as shown by the dotted lines 5 in said Fig. 2, to enable the operator to get at the engine or mechanism within.

At the top of each side 2 are secured in the well-known way the side pieces 6, $6^a$, and $6^c$, upon which the seats 7, 8, and 9 of the carriage are mounted. The front portion 10 of the seat 8 and the platform 11 in front of the rear seat 9 are all made easily removable. The seat 8 is mounted on the sill 12 by hinges 13, and after the portion 10 has been removed can be turned up, substantially as shown by the dotted lines $13^a$ in Fig. 2. The back 14 of the rear seat is also hinged at the point 15, so that it can be turned up, as shown by the dotted lines $15^a$ in said Fig. 2, thereby affording the means whereby the engine and all parts of the operating mechanism can be easily exposed when required.

The body of the carriage is supported at the front end by a transverse elliptic spring 16, (see Figs. 2 and 7, where this spring is shown,)

which rests upon the bed-piece 18 and is secured thereto and to the bolster 17 by the usual clips 18ª. (See Fig. 7.)

The rear end of the carriage-body rests and is supported upon two elliptic springs 19, extending lengthwise, one at each side of the carriage, a side elevation of one of said springs being shown in Fig. 1 and an end view of both springs in Fig. 8. Two supporting-brackets 20 (see Figs. 1 and 8) are rigidly secured one to each side of the body of the carriage, and the upper side of each spring is securely fastened thereto by a bolt 21. (See Fig. 1.)

In describing the motor and a machinery-supporting frame reference is had to Figs. 2 and 5. The said supporting-frame consists of two substantially parallel longitudinal pieces of angle-iron 22 and 22ª. (See Fig. 5, also Fig. 2.) Their front ends are each supported on a heavy spring 23. (See Fig. 2, where a side elevation of one of these springs is shown.) One end of each of these springs 23 is pivoted to the under side near the ends of the angle-iron frame-pieces by a pin 24 and the opposite ends are secured by a bolt 25, which passes through a slot in the end of each of said springs, so as to allow the springs to have a slight backward-and-forward movement when in use, and the bolts 25 pass into and are rigidly secured to the angle-iron frame-pieces. Both of the angle-iron frame-pieces are preferably reinforced by a strip of hard wood 26, (see Fig. 7, where the front ends of these frame-pieces are shown,) the wood being secured thereto by bolts in the well-known way.

The rear portions of the angle-iron frame-pieces rest upon and are secured to two parallel bars 27 and 27ª, the ends of which in turn rest upon and are secured to strong springs 28 and 28ª. (See Fig. 5, where a plan view of the springs is shown, and Fig. 8, where an end view is shown.) These springs are rigidly secured to boxes 29, through which the rear axle passes on roller-bearings.

In addition to all the parts composing the motor and operating mechanism-supporting frame, as above described, it is further strengthened by side braces 30 30ª, as shown in Fig. 5.

From the above description it will be noticed that the machinery-supporting frame is supported upon springs which are independent of and separate from the springs supporting the carriage-body. Furthermore, they are much stronger and stiffer than the carriage-body springs and better adapted to hold the weight of the motor and its operating mechanism.

The mechanism for steering the carriage is located on the machinery frame and is constructed as follows: The two front wheels 1 are each mounted on a short axle-arm 31, (see Fig. 7,) having a downward-extending arm 32 and an upward-extending ball-bearing portion 33, provided with a ball-race carrying a series of balls 34, (see Fig. 9,) and centrally within the ball-race is a vertical pin 35, which extends up through the end of the bed-piece 18, and is secured by a nut 36, so as to turn therein. The balls rest against a ball-bearing plate 37, substantially as shown in said Fig. 9. Extending downward and diagonally each way from the center of the bed-piece 18 are two braces 38, into the ends of which the lower ends of the arms 32 are pivotally connected at 39. (See Fig. 7.) This construction securely supports the front wheels in their required position and allows them to be turned substantially as shown in Fig. 5 by the dotted lines 39. To the under side of the longitudinal frame-bars 22 22ª is rigidly bolted a transverse bar 40, and to the under side of the transverse bar 40 is centrally pivoted a bar 41 by a pin or bolt 42, (see Figs. 5 and 7,) having at each end a connecting-rod 43, pivoted thereto by pins 44, (shown in Fig. 5,) and the opposite ends of the said connecting-rods 43 are pivoted to the ends of the axle-arms 31 by pins 45. To one end of the bar 41 is also pivoted, preferably by the same pin, a connecting-rod 46, (see Fig. 5,) which extends toward the back of the carriage and is pivotally connected by a pin 46ª to a screw-threaded longitudinally-movable bar 47. The bar 47 is mounted in a substantially horizontal position in a box 48, (see Fig. 5,) and is fitted in said box, so as to be capable of sliding longitudinally back and forth without turning therein. On the screw portion of the bar 47 is mounted a small bevel gear-wheel 48, having an internally-screw-threaded opening into which the screw-threaded bar 47 is adapted to fit and engage. This bevel gear-wheel 49 is inclosed within the frame portion 48ª (a portion being cut away to receive the same, as shown in Fig. 5) and is restrained thereby from longitudinal movement while free to rotate on the screw-bar, and thus actuate a backward or forward movement to said screw-bar. 50 represents a larger bevel gear-wheel in gear with the bevel gear-wheel 49. It is rigidly attached to a substantially vertical shaft 51, (shown in Figs. 1, 2, 5, and 8,) and the said shaft is provided at its top with a hand-wheel 52, which is located within convenient reach of the operator. This hand-wheel 52 is shown in Figs. 1, 2, and 8, and is omitted in Fig. 5, so as to expose the mechanism below it.

From the above description it is now evident that if the hand or steering wheel 52 be turned in either direction the gear-wheel 50 will rotate the gear-wheel 49 upon the screw-bar 47, and thereby move the screw-bar longitudinally back and forth, and through the connecting-bar 46, the pivoted cross-bar 41, and its connecting-rods 43, having their opposite ends connected with the axle-arm 31, the front wheels will be turned, substantially as indicated by the dotted lines 39ª in Fig. 5.

The object in employing a screw-bar 47 with a slow lead is to prevent it being drawn through its box or the bevel-wheel 49 by any means other than the rotation of the bevel-wheel upon the screw-bar, thus providing means to hold the carriage-wheels in any desired position they may be turned until the bevel-wheel is again revolved. This is a most important advantage in a machine of the class described, because a horseless carriage or wagon under headway is exceedingly difficult to manage, especially on a rough road, and the sudden jerking of the steering-wheel on the hands of the operator is a constant trouble, as almost any little obstruction upon meeting or striking one of the wheels is very liable to turn the vehicle in the wrong direction against all the force the operator can exert. The use of a screw as above set forth avoids these objections.

The object in making the horizontal or driving bevel gear-wheel larger than the driven bevel gear-wheel 49 is to increase the movement of said wheel 49, because of the slowness of the screw, and thereby give a quicker response to any movement of the steering-wheel.

The engine or motor 54 (which is preferably a kerosene-oil engine) is firmly and rigidly supported upon and secured to the angle-iron frame portions and their connecting parts. (See Figs. 2 and 5.)

55 represents the connecting-rod connecting with the crank-shaft 56. The crank-shaft (see Fig. 5) is mounted in boxes 57 on the engine frame-pieces 58, the outer portions of said shaft being supported in boxes on vertical supports 59, secured on the angle frame-bars. Mounted on the crank-shaft are two fly-wheels 60 and 60ª. The end 61 of said shaft (see Fig. 5) extends outward, so it can be grasped by a wrench or any other well-known tool adapted for the purpose to enable the operator to start the engine. The opposite end of said shaft is provided with a crank-arm or crank-disk 62.

The power-transmitting mechanism connecting the engine or motor to the wheels is clearly shown in Figs. 2, 3, 4, and 5, and Figs. 10 to 18, inclusive, on the last sheet of drawings, and the following is a description in detail of the same.

On or near one side of the crank-disk 62 is a pin 63, preferably carrying a friction-roller 64, as shown in Fig. 2, or a box 64ª, as shown in Fig. 10. To the frame portion is pivoted by a pin 65 (see Fig. 10, where the pin 65 is shown) a slotted arm 66, a detached side elevation of which is shown in Fig. 16. Into the slot 66ª in said arm 66 is fitted the friction-roller 64, as in Fig. 2, or the box 64ª, as illustrated in Fig. 10.

67 represents a spur gear-wheel which is rigidly secured to the rear axle 67ª, (see Fig. 2,) and mounted in boxes 68 and 68ª is a shaft 69, (see Fig. 5,) carrying a spur gear-wheel 70, adapted to gear in with the gear-wheel 67. In front of the gear-wheel 70 is a smaller gear-wheel 71, rigidly secured to the same shaft. A forked arm adapted to fit over each side of the wheel 71 is mounted on the shaft 69, so as to swing thereon. The construction and operation of this forked arm will be more clearly understood by reference to Figs. 2, 3, 4, and 6. 72 represents the two parts which fit over the sides of the gear-wheel 71 and are pivotally secured to the shaft 69. The two side pieces 72 extend the entire length of the arm and may be formed in one piece with the cross-pieces 73, or the cross-pieces 73 may be made separate and the parts secured together in the usual way by screw-bolts, as shown in Fig. 4. At the top of this forked vibratile arm is pivoted the end of a connecting-rod 74 by means of two pins or trunnions 75, which fit in holes in the sides 72, adapted to receive them. (See Fig. 4.) The holes through which the trunnions 75 pass are slightly elongated, so as to leave a small opening 76 in front of the pins or trunnions 75. (See Fig. 11, where this is shown in section.) Back of the forked portions 72 is a washer 77, and mounted on the arm 74 is a spring 78, preferably of vulcanized india-rubber, but a spiral steel spring may be used, and a screw-nut 78ª is employed to regulate the force of the spring. (See Fig. 11.) The object of this construction is to give a small amount of elasticity to the forward thrust of the arm 74. A modification of this elastic construction is shown in Fig. 12, and instead of the rubber spring, as shown in Fig. 11, a sliding box 79, with a strong spiral spring 80, is employed. A vertical elongated opening 81 extends down through the end of the arm. (See Fig. 11, where this is shown; also Fig. 12, where the opening is indicated by dotted lines.) The object of this opening will be explained farther on. The construction of the opposite end of the arm 74 will be understood by reference to Figs. 11, 12, 13, 14, and 15, also Figs. 17 and 18. The opposite end of the portion 74 is rigidly secured to the end portion 82 by bolts 83. In the face of the portion 82 is a depression or recess 84, the two opposite sides of which form a portion of a circle the center of which is the center of a recess 84. (See Figs. 12 and 13.) In the center of the depression is a circular opening 85. (See Fig. 13, where a section is shown through this opening. It is also shown in dotted lines in Figs. 12 and 14.)

86 represents a partly-circular plate adapted to fit and turn in the recess 84. It is provided with an outward-extending pivotal pin 87, which is adapted to pass through the central hole 85 when the plate 86 is in place within the recess 84, a nut 85ª securing it therein. (See Figs. 10 and 11.)

The plate 86 is provided with a transverse recess 88, forming a slideway in which the rock-bar 66 is fitted, so that said plate 86 may slide easily up or down thereon. On each side of the bar 66 are two grooves 89, (see Figs. 16 and 17,) in each of which an overlapping plate 90 (shown in Figs. 11, 12, and 18) is fitted and secured by screws 91. (See Fig 12.) These overlapping plates secure said plate 86 and allow it to slide freely up or down on the arm 66.

The mechanism for driving the vehicle and starting, stopping, or reversing its movements will be understood by reference to Figs. 2, 3, 4, 5, 6, and 10. In the cross-pieces 75, which secure the parts 72, composing the forked arm, together, is mounted in a substantially vertical position a pawl 92, round in cross-section and having a sharp flat driving portion 93, which is beveled upward from the opposite sides of the driving edges. (See Figs. 3 and 4.) Rigidly secured to this pawl is a collar 94, (shown in Figs. 3 and 4,) and between the collar 94 and the upper cross-piece 73 is a spiral spring 95, surrounding the pawl. The spring 95, when free to act, keeps the pawl in engagement with the wheel 70. At the top of the pawl 92 is rigidly secured a rod 96, of lesser circumference than the pawl, which passes up through the opening 81 in the arm 74 and is provided at the top with an enlarged pivotal portion 97. (See Figs. 3 and 4.) To the portion 97 is pivoted a slotted bar 98, (see Figs. 2 and 10,) and mounted in bearings, so as to have both a vertical and rotatable movement therein, is a round bar 99, having an operating-handle $1^g$ at the top and a pin $1^c$ at its lower end, where it is secured in the slot. (See Fig. 2, where this is shown. (See also Fig. 10.)

The object of the slot in the slotted bar 98 is to permit the vibration of the arm 72 without interfering with or moving the pin $1^c$ connecting it with the bar 99, as will be understood by reference to the dotted lines $2^c$ and $3^c$ in Fig 10.

From the above-described construction it will be noticed that the pawl may be lifted up out of engagement with the wheel 71 to instantly disengage the operating-motor from the driven wheel, or it may be lifted up from engagement with said wheel and then given a half-turn around, so as to bring its driving portion on the opposite side, and then brought into reëngagement with the wheel 71, thus reversing its action and the traveling direction of the carriage.

The mechanism for regulating the speed of the vehicle consists of an angular arm $3^g$, pivoted by a pin $4^g$ to a support $5^g$. (See Fig. 2, also Fig. 10.) At the top of the arm $3^g$ is a handle $6^g$ and a pivoted portion $7^g$, connected with a bolt and the usual curved rack $8^g$, for securing it at any point to which it may be adjusted. The opposite end of the arm $3^g$ is pivoted to a connecting-link $9^g$, having its lower end pivoted to an ear $1^h$ on the portion 82 of the arm 74 by a pin $2^h$. (See Figs. 2 and 10.) In place of the arm $3^g$ and link $9^g$ a screw may be used to operate the arm 74 and portion 82.

By reference to Fig. 10 it will be seen that a pin $3^h$ is rigidly secured to the rod 99, which extends outward at right angles therefrom, and on one of the supports at each opposite side of the rod 99 is mounted a pair of upward-extending holding-lugs $4^h$, between which the pin $3^h$ drops when the handle $6^g$ is let downward, and thereby securely held from turning when the pawl is set to operate in either direction.

The engine 54 is supported on a bed of vulcanized india-rubber $5^h$, (see Fig. 2,) the object being to take the jar of the engine as much as possible from the carriage and to deaden the sound of the operating machinery.

In Fig. $2^a$ I have shown a detached side elevation of one of the springs supporting the engine and its operating machinery, showing some of the features that do not appear in the other figures. The springs are rigidly secured to the bolster in the usual way by clips $6^h$. To regulate the force of the springs and to prevent the platform carrying the engine and its accompanying machinery from jumping and straining the operating mechanism or the loosening of the bolts which hold it in position by the vibrating action of the engine or when the carriage is passing over an obstruction, I extend either from a clip rigidly secured to the bolster in the ordinary way or from the spring extending up through the bolster a rod $7^h$, around which is placed a spiral spring $8^h$. A screw-nut $9^h$ is fitted upon the upper end of the rod $7^h$, and the spiral spring is adjusted to the required tension by screwing the said nut upward or downward, as required. This construction insures a strong spring force against an upward thrust as well as a lower thrust and greatly relieves the carriage from any sudden concussion that might be given to it by a stone or other obstruction while traveling rapidly along the road. It also provides the means for adjusting the strength of the upper and lower springs, which can be regulated, as above described, by the nut $9^h$.

The operation of the machine is as follows: The handle $6^g$ is turned back so as to lift the arm $3^g$ high enough to raise the arm 74, so that the pivotal pin 87 on the sliding portion 86 will coincide with the pivotal pin 65 of the slotted bar 66. In this position the engine may be operated without having any action on the mechanism for driving the vehicle. The engine being now started, the connecting-rod 55, (see Fig. 2,) turns the crank-disk and vibrates the arm 66. To start the vehicle, the handle $6^g$ is moved sufficiently in the direction of the arrow V to lower the forward end of the arm 74 far enough to communicate the required speed to the vehicle. This operation allows the vibrating arm 66 to operate the pawl 92, and thereby turn the gear-wheels 71 and 70, which motion being transmitted by the wheel 67 to the shaft propels the vehicle. When it is desired or becomes necessary to reverse or drive the vehicle in a backward direction, the handle $1^g$ is raised sufficiently to disengage the pawl from the wheel 71, and then given a half rotation or turn and again lowered to bring the pawl again into engagement with the gear-wheel 71, thus reversing the direction of the rotation of said gear-wheel and the running direction of the vehicle.

It will be noticed that in Fig. 10 I have omitted the gear-wheels 67 and 70 and secured the gear-wheel 71 directly on the rear axle. This simplifies and cheapens the construction and is preferable, especially when it is desired to build a vehicle to run at a lower rate of speed.

I claim as my invention—

1. In a motor-carriage, the combination of the operating-motor, an arm adapted to be vibrated by said motor; a pawl-arm and toothed driving-wheel mounted on the same shaft, a pawl mounted on the pawl-arm and capable of a rotating and a vertical movement and having its upper end pivoted to a slotted bar and its lower end in engagement with the driving-wheel, a vertically-movable bar having its lower end connected by a pin with the slot in the slotted bar and its upper end provided with a handle, and a connection between the vibratile arm and the pawl-arm for operating the pawl-arm, as set forth.

2. In a motor-carriage, the combination of a vibratile arm pivoted to a support on the carriage-frame, a motor for giving it a uniform vibrating movement, a toothed driving-wheel an arm mounted on said driving-wheel shaft and carrying a pawl adapted to engage with the teeth in said driving-wheel, means for keeping the pawl in engagement with a yielding force, a connecting-arm pivotally connected with the pawl-arm and having its opposite end pivoted to a sliding piece adapted to slide up or down on the vibratile arm, and means for moving its pivotal center on the sliding piece in a line with the pivotal center of the vibratile arm, and thereby stopping the vehicle, or moving it from the pivotal center of the vibratile arm, for the purpose of varying the speed of the vehicle, as above set forth.

3. In a motor-carriage, the combination with the motor and mechanism for operating the pawl-arm, of a pawl-arm and toothed driving-wheel mounted on the same shaft, a pawl mounted on the pawl-arm and capable of a rotating and a vertical movement and having its upper end pivoted to a slotted bar and its lower end in engagement with the driving-wheel, a vertically-movable bar having its lower end connected by a pin with the slot in the slotted bar and its upper end provided with a handle, for the purposes described.

4. In a motor-carriage, the combination of a vibratile arm pivoted to the supporting-frame, a motor and means for operating said arm, a toothed driving-wheel, a pawl-arm mounted on the same shaft with the driving-wheel and carrying a pawl in engagement with the teeth in said driving-wheel, a connecting-arm pivotally connected with the vibratile arm and the pawl-arm, and means within reach of the operator for lifting said pawl out of engagement with the teeth in the driving-wheel and thereby instantly stopping the propelling force of the vehicle.

5. In a motor-carriage, the combination of a vibratile arm pivoted to the support on the supporting-frame, a motor and connecting means for operating said arm, a toothed driving-wheel, a pawl-arm carrying a pawl adapted to engage with the teeth on said driving-wheel and mounted on the same shaft therewith, and an arm pivotally connecting it with the vibratile arm, a rod extending up from said pawl above the pawl-arm and pivoted to a slotted bar, a vertical bar provided with a handle, mounted in bearings so it can be moved easily up or down or turned therein, and connected with the slot in said slotted bar by a pin, and means for securing it when turned and set for either a forward or backward movement of the carriage, as above described.

6. In a motor-carriage, the combination with the supporting-frame, the operating-motor having its shaft provided with a crank device and the rear wheels of the carriage and their shaft, of a vibratile arm pivoted at or near its upper end to the frame and having a longitudinal slot at or near its lower end in which the crank device is supported and travels, a spur gear-wheel rigidly mounted on the rear-wheel shaft, a short supplementary shaft journaled upon the frame, a spur gear-wheel also mounted upon said supplementary shaft, and adapted to gear with the gear-wheel upon the main shaft, a second gear-wheel mounted upon the supplementary shaft, a forked arm adapted to fit over each side of the gear-wheel and pivotally mounted on the supplementary shaft so as to swing thereon, a pawl supported by said forked arm and adapted to engage with the teeth in the gear-wheel, a connecting-rod pivoted at or near the top of the forked arm, a spring to give a slight amount of elasticity to the forward thrusts of said arm, a slideway portion at the opposite end of the connecting-rod adapted to fit the vibratile arm and means for longitudinally moving said slideway upon the vibratile arm, as set forth.

7. In a motor-carriage, the combination with the supporting-frame, the operating-motor, and the wheels of the carriage, of a vibratile arm pivoted at one end to the frame and connected at the other to the motor-crank, a shaft journaled in the frame, a gear-wheel connected with the carriage-wheels, a pawl having a beveled lower end forming a driving edge on one side, a supporting device for said pawl, swinging pivotally from the gear-wheel shaft, means for nominally holding said pawl driving edge in engagement with the gear-wheel, a connecting-rod pivoted to the upper end of the supported device, a slideway on the opposite end of said rod adapted to fit and move longitudinally on the vibratile arm, an arm within reach of the operator for moving said rod and slideway portion upon the vibratile arm to vary the length of the strokes of the connecting-rod and thereby vary the speed of the carriage, and an arm within reach of the operator for disengaging the pawl from the gear-wheel and thereby stopping the transmission of power, or for disengaging and half-rotating the pawl, to reverse the running direction of the carriage, as set forth.

8. In a motor-carriage, the combination of a slotted vibratile arm pivoted to a support on the carriage-frame, an operating-motor having a crank-arm adapted to slide in the slot in the vibratile arm for imparting a uniform vibrating movement to said arm, a driving-wheel, an operating-arm mounted on said driving-wheel shaft and carrying a device adapted to detachably engage with the driving-wheel, means for keeping said device in engagement with a yielding force, a connecting-arm pivotally connected with the operating-arm and having its opposite end pivoted to a sliding piece adapted to slide up or down on the vibratile arm, means for moving its pivotal center on the sliding piece in a line with the pivotal center of the vibratile arm, and thereby stopping the movement of the operating-arm, or moving it from the pivotal center of the vibrating arm, for the purpose of varying the speed of the vehicle, and means for disengaging the operating-arm and its device from or changing its position thereon and thereby stopping the transmission of power or reversing the running direction of the carriage, as set forth.

9. The combination with the supporting-frame, the operating-motor and its shaft, and the driven wheels of the carriage, of a vibratile arm swinging from a pivot on the supporting-frame and having a slot in which the crank of the operating motor-shaft is sustained and travels, a toothed gear-wheel, a pawl-arm provided with a pawl having a beveled lower end forming a driving edge on one side, a rod connecting said pawl-arm to the vibratile arm to vibrate the same and means for rotating the pawl to present its driving edge to one side or the other of the teeth on the gear-wheel, as set forth.

10. In a motor-carriage, the combination with the supporting-frame, the operating-motor, and the wheels of the carriage, of an arm vibrated by the operating-motor, a gear-wheel in connection with the driven wheels of the carriage, a swinging arm having a pawl engaging with the gear-wheel, a connecting-rod between the vibratile arm and an arm within reach of the operator for varying the position of the connecting-rod with respect to the vibrated arm to lengthen or shorten the strokes of the swinging arms and correspondingly increase or decrease the speed of the carriage, as set forth.

11. In a motor-carriage, the combination with the carriage body and frame, of a shaft rotatably supported in the frame, and provided with a steering-wheel at its upper end and a bevel-gear at or near its lower end, a screw-bar unrotatably supported while free to move longitudinally, a bevel-gear held in engagement with the bevel-gear on the shaft and engaging with the screw-thread on the bar to control the longitudinal movement of said bar, and rods connecting said screw-bar with the front wheels to steer the vehicle, as set forth.

12. In a motor-carriage, the combination with the carriage and its frame, of a steering-wheel shaft mounted in suitable bearings near the rear of the carriage and carrying a steering-wheel at its top and a bevel gear-wheel at its foot, a screw-bar mounted in boxes in a substantially horizontal position, provided with a screw-thread on a portion of its surface and adapted to move back and forth in its bearings without turning therein, a bevel gear-wheel in engagement with the bevel gear-wheel at the foot of the steering-wheel shaft, mounted on said screw-bar and in engagement with the screw-thread thereon, means for preventing it from moving longitudinally in its bearings while free to rotate, a connecting-rod having one end pivoted to the screw-bar, and its opposite end pivoted to a transverse bar centrally pivoted to the under side of the carriage-frame, two short axle-bars pivoted to the frame, front wheels rotatably mounted on the outer ends of said axle-bars, and connecting the ends of the transverse bar with the axle-bars for turning them, and thereby steering the vehicle.

13. In a motor-carriage, the combination with the frame of two short axle-bars pivotally sustained by the front portion of said frame, the front wheels rotatably mounted at the outer ends of said bars, a transverse bar centrally pivoted to the frame, rods connecting the ends of said bar with the inner ends of the axle-bars, a bar having a peripheral screw-thread mounted at or near the rear of the frame and having a longitudinal movement only, a rod connecting the front end of said screw-threaded bar with the transverse bar, a gear-wheel engaging with the screw-thread upon said bar, and means within reach of the operator for rotating said gear-wheel and moving the screw-threaded bar longitudinally, as set forth.

14. In a motor-carriage, the combination with the frame, of two short axle-bars pivotally sustained by the front portion of said frame, the front wheels rotatably mounted at the outer ends of said bars, a transverse bar centrally pivoted to the frame, rods connecting the ends of said bar with the inner ends of the axle-bars, a bar having a peripheral screw-thread mounted at or near the rear of the frame and having a longitudinal movement only, a rod connecting the forward end of said screw-threaded bar with the tranverse bar, a bevel gear-wheel engaging with the screw-thread upon the bar, and an arm within control of the operator and provided with a bevel gear-wheel meshing with the bevel gear-wheel engaging with the screw-threaded bar, as set forth.

15. In a motor-carriage, the combination with the frame and the steering-wheels, and their supporting-axles, of a peripherally-screw-threaded bar, unrotatably supported by said frame while free to move longitudinally, devices connecting said bar to the axles, a bevel gear-wheel inclosed within the frame portion supporting the screw-threaded bar and having an interiorly-screw-threaded opening encircling the screw-bar and adapted to engage with the screw-thread thereon, and an operating-rod provided at its lower end with a bevel gear-wheel meshing with the gear-wheel encircling the screw-bar, as set forth.

16. In a motor-carriage, the combination with the frame, of two short front axles pivotally supported at their ends by said frame, wheels journaled at the outer ends of said axles, a transverse bar pivoted centrally to the frame, rods connecting the bar to the axles, a peripherally-screw-threaded bar, unrotatably supported by said frame while free to move longitudinally, rods connecting said screw-bar to the transverse bar, a bevel gear-wheel inclosed within the frame portion supporting the screw-threaded bar and having an internally-screw-threaded opening encircling the screw-bar, and adapted to engage with the screw-thread thereon and an operating-rod provided with a hand-wheel at its upper end and at its lower end with a bevel gear-wheel meshing with the gear-wheel encircling the screw-bar, whereby the rotation of the hand-wheel upon the operating-rod in either direction will cause its gear-wheel to rotate the gear-wheel encircling the screw-bar, and thereby move the screw-bar backward or forward according to the direction of the rotation, and through the connecting-rod move the transverse bar upon its central pivot and correspondingly the front axles and wheels, thereby steering the carriage, as set forth.

17. In a motor-carriage the combination with the front wheels, of a carriage, of two short axle-bars supporting the said front wheels, a brace extending down from the bolster and laterally each way in which the lower extension portions of the axle-bars are pivoted, two connecting-rods each having one end pivoted to a horizontal axle-bar and their opposite ends pivoted to a transverse bar pivoted centrally to the machinery platform, a connecting-bar pivoted to one end of the transverse centrally-pivoted bar and having its opposite end pivoted to a screw-bar carrying a bevel gear-wheel mounted in a support so that while it cannot move backward or forward it is free to rotate, a vertical steering-bar mounted in suitable bearings and having at its top a hand-wheel and at its foot a bevel gear-wheel in engagement with the bevel gear-wheel on the screw-bar, as set forth.

18. In a motor-carriage, the combination of a steering-wheel shaft mounted in suitable bearings near the rear of the carriage, and carrying a steering-wheel at its top and a bevel gear-wheel at its foot, a screw-bar mounted in boxes in a substantially horizontal position, provided with a screw-thread on a portion of its surface and adapted to move back and forth in its bearings without turning therein, a bevel gear-wheel in engagement with the bevel gear-wheel at the foot of the steering-wheel shaft, mounted on said screw-bar and in engagement with the screw-thread thereon, means for preventing it from moving longitudinally in its bearings while free to rotate, a connecting-rod having one end pivoted to the screw-bar, and its opposite end pivoted to a transverse bar centrally pivoted to the under side of the carriage-frame, and connecting-rods connecting the ends of the transverse bar with the front wheels for turning them and thereby steering the vehicle.

19. In a motor-carriage, the combination with the front wheels of a carriage, of two short axle-bars carrying the front wheels, each provided with an upper and lower pivotal extension, ball-bearings in the upper extensions upon which the ends of the bolster rest and are pivotally secured, a brace extending down from the bolster and laterally each way in which the lower extension portions of the axle-bars are pivoted, and mechanism pivoted to the inner ends of the axle-bars and having pivotal connections with the steering mechanism, for operating the two front wheels simultaneously and thereby steering the carriage.

20. In a motor-carriage, the combination with the front wheels of a carriage, of two short axle-bars carrying the front wheels, each provided with an upper and lower pivotal extension, ball-bearings in the upper extensions upon which the ends of the bolster rest and are pivotally secured, a brace extending down from the bolster and laterally each way in which the lower extension portions of the axle-bars are pivoted, two connecting-rods each having one end pivoted to a horizontal axle-bar and their opposite ends pivoted to a transverse bar pivoted centrally to the machinery platform, a connecting-bar pivoted to one end of the transverse centrally-pivoted bar and having its opposite end pivoted to a screw-bar carrying a bevel gear-wheel mounted in a support so that while it cannot move forward or back it is free to rotate, a vertical steering-bar mounted in suitable bearings and having at its top a hand-wheel and at its foot a bevel gear-wheel in engagement with the bevel-wheel on the screw-bar, as set forth.

21. In a motor-carriage, the combination with the engine and its supporting-platform, of spring mechanism for limiting the upward movement of said engine and platform and means for adjusting said spring mechanism to regulate its limiting movement.

22. In a motor-carriage, the combination of the carriage-body, its supports, springs interposed between said carriage-body and said support, the operating-engine, an independent supplementary support for said engine, springs interposed between said engine-support and the carriage-support, and an india-rubber cushion interposed between the engine and its support to deaden and partially prevent the transmission of the sound and vibration of the engine.

23. In a motor-carriage, the combination with the engine, its supporting-platform and springs interposed between said engine and supporting-platform, of supplementary springs for limiting the upward movement of said engine and supporting-platform, and means to adjust said springs to regulate their limiting movement.

24. In a motor-carriage, the combination of the engine and its supporting-platform, a layer of india-rubber between said engine and its supporting-platform, and springs for limiting the upward movement of said engine and platform.

25. In a motor-carriage, the combination with the engine, its supporting-platform and the rubber cushion interposed between said engine and supporting-platform, of supplementary springs for limiting the upward movement of said engine, and supporting-platform.

26. In a motor-carriage, the combination with the engine, its supporting-platform and the rubber cushion interposed between said engine and supporting-platform, of supplementary springs for limiting the upward movement of said engine and supporting-platform, and means to adjust said springs to regulate their limiting movement.

27. In a motor-carriage, the combination with the semi-elliptic springs, secured below the bolster and supporting-frame, upon which the frame or platform for supporting the engine and operating mechanism rests, of a bolt extending up from the lower spring and bolster and up above the top of the supporting-frame, a spiral spring resting on said supporting-frame and over said bolt, and a nut for readjusting said springs.

28. In a motor-carriage, the combination with the engine, its supporting-platform and springs interposed between said engine and supporting-platform of supplementary springs for limiting the upward movement of said engine and supporting-platform, and means to adjust said springs to regulate its limiting movement.

29. A motor-carriage, comprising the body provided with removable end, side and top portions, an operating-motor supported upon springs within said body, the carriage-supporting frame and running-gear and springs interposed between said frame and gear and the carriage-body.

30. A motor-carriage, comprising a carriage-body forming an inclosing case, a motor within said case, a motor-supporting frame, springs supporting said supporting-frame and means for allowing a slight backward or forward movement to said springs, as set forth.

31. A motor-carriage, comprising the carriage-body, its support, the operating machinery, an independent support for said machinery, and springs interposed between said independent support and the carriage-support, means for allowing a slight backward or forward movement to said springs and supplemental springs for limiting the upward movement of said independent support.

32. A motor-carriage, comprising the carriage-body, its support, the operating-motor, an independent support for said motor, double-acting springs for restraining said independent support with a spring force in both an upward and downward direction, means for regulating said springs and means for allowing a slight forward or backward movement thereto, as set forth.

33. In a motor-carriage, the combination with the motor, of the body, forming an inclosing case for said motor, and comprising the bottom, sides, front portion, rear portion hinged at its lower edge to the bottom, the side pieces, seats supported upon said side pieces and forming removable portions of said body or inclosing case, and a removable platform, as set forth.

34. In a motor-carriage, the combination with the motor and operating mechanism, of the carriage-body forming an inclosing case for said motor and operating mechanism, and having hinged seats and rear end portion whereby the motor and operating mechanism are exposed when required, as set forth.

HENRY R. BIRD.

Witnesses:
A. J. SANGSTER,
G. A. NEUBAUER.